United States Patent
Beausoleil et al.

(10) Patent No.: US 8,090,568 B2
(45) Date of Patent: Jan. 3, 2012

(54) HARDWARE EMULATOR HAVING A VARIABLE INPUT PRIMITIVE

(75) Inventors: William F. Beausoleil, Hopewell Junction, NY (US); Beshara G. Elmufdi, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 940 days.

(21) Appl. No.: 11/358,527

(22) Filed: Feb. 21, 2006

(65) Prior Publication Data

US 2007/0198241 A1 Aug. 23, 2007

(51) Int. Cl.
*G06F 9/455* (2006.01)

(52) U.S. Cl. .......................................... 703/23

(58) Field of Classification Search ........................ None
See application file for complete search history.

(56) References Cited

U.S. PATENT DOCUMENTS

| | | | |
|---|---|---|---|
| 5,426,378 A | 6/1995 | Omg | |
| 5,551,013 A * | 8/1996 | Beausoleil et al. | 703/23 |
| 5,612,891 A | 3/1997 | Butts et al. | |
| 6,051,030 A | 4/2000 | Beausoleil et al. | |
| 6,590,415 B2 * | 7/2003 | Agrawal et al. | 326/38 |
| 6,618,698 B1 | 9/2003 | Beausoleil et al. | |
| 2002/0184001 A1 | 12/2002 | Yao | |
| 2005/0171756 A1 | 8/2005 | Gooding et al. | |

OTHER PUBLICATIONS

International Search Report mailed Jul. 10, 2007 for PCT Application No. PCT/US2007/004435.
Written Opinion mailed Jul. 10, 2007 for PCT Application No. PCT/US2007/004435.
Murgai et al., "Logic Synthesis for a Single Large Look-up Table"; computer design: VLSI in computers and processors, 1995. ICCD '95 proceedings., 1995 IEEE International Conference, Austin, TX, pp. 415-424.
Saab et al., "Hierarchical Multi-Level Fault Simulation of Large Systems", journal of Electronic Testing, (Online) vol. 1, No. 1, May 1990, pp. 139-149.
Supplementary European Search Report dated Dec. 23, 2009 for application No. 07751209.3-2211 / 1987427 PCT/US2007004435.

* cited by examiner

*Primary Examiner* — Dwin M Craig
(74) *Attorney, Agent, or Firm* — Holland & Knight LLP; Brian J. Colandreo, Esq.; Mark H. Whittenberger, Esq.

(57) ABSTRACT

A hardware emulator having a first primitive for evaluating functions having a first input width and a second primitive, coupled to the first primitive, for evaluating a function having a second input width, where the first input width is unequal to the second input width. The use of either the first primitive or the second primitive is selected depending upon the function to be evaluated.

24 Claims, 4 Drawing Sheets

HARDWARE EMULATOR HAVING A VARIABLE INPUT PRIMITIVE

BACKGROUND OF THE INVENTION

1. Field of the Invention

Embodiments of the present invention generally relate to a hardware emulator for emulating a system composed of logic gates, and more particularly, to a hardware emulator having a variable input primitive.

2. Description of the Related Art

Hardware emulators are programmable devices used in the verification of hardware design. A common method of hardware design verification is to use processor-based hardware emulator to emulate the design. These processor-based emulators sequentially evaluate combinatorial logic levels, starting at the inputs and proceeding to the outputs. Each pass through the entire set of logic levels is known as a cycle; the evaluation of each individual logic level is known as an emulation step.

An exemplary hardware emulator is described in commonly assigned U.S. Pat. No. 6,618,698 titled "Clustered Processors in an Emulation Engine", which is hereby incorporated by reference in its entirety. Hardware emulators allow engineers and hardware designers to test and verify the operation of an integrated circuit, an entire board of integrated circuits, or an entire system without having to first physically fabricate the hardware.

The complexity and number of logic gates present within an integrated circuit has increased significantly in the past several years. Hardware emulators need to improve in efficiency to keep pace with the increased complexity of integrated circuits. The speed and logic gate efficiency with which a hardware emulator emulates an integrated circuit is one of the most important benchmarks of the emulator's efficiency, and also one of the emulator's most important selling factors in the emulator market.

A hardware emulator comprises multiple processors, which are generally a portion of a processor module, where the processor module comprises a processor as well as related supporting circuitry. The processor modules are arranged into groups of processor modules called clusters, and the clusters of processor modules collectively comprise the emulation engine that forms a core element of a hardware emulator. During each process cycle, each processor is capable of emulating a logic gate, mimicking the function of a logic gate in an integrated circuit. The processors are arranged to compute results in parallel, in the same way logic gates present in an integrated circuit compute many results in parallel. This creates a chain of logic similar to what occurs in an integrated circuit. In the chain of logic, efficient communication between processors is crucial.

A processor receives a small amount of input data, typically four bits, and utilizes a "primitive" to emulate a logical function that would otherwise be performed by a logic gate of the hardware being emulated. In a process known as evaluation, a primitive translates the input data into an output bit to emulate the function performed by the gate being emulated. The resulting bit is the output that would be generated by the one or more gates being emulated. In this manner, a primitive is used to evaluate the function performed by the gate. To facilitate such an evaluation, the primitive comprises a lookup table that contains a logic table of all the possible results (output bit values) of the function being evaluated. The logic table maps all possible input data combinations to all possible bit values. A four input primitive comprises a logic table with sixteen bits of output data to be able to produce all possible valid results of the function. The four input bits are used, in essence, as an address to select a location in the lookup table containing a data bit that forms the output of the function for a particular set of four input bits. By setting an appropriate mapping of input bits to output bit (i.e., by loading appropriate table values), the logic table provides the valid result of any function that uses four input bits or less.

In certain emulators where the gates to be emulated have a large number of input bits (e.g., greater than four bits), it is desirable to have a processor utilize primitives having more than four bits of input data. One solution decomposes the function of large input gates into many levels of four input primitives. Each level performs a portion of the total gate function and the output of each level is combined with the output of other primitives representing other levels to achieve a final output of the large input gate. To facilitate such a multi-level evaluation of a gate, the input data is divided into many portions and a separate primitive processes each portion. Each evaluation of a data portion occurs during a single step of the emulation cycle. As more primitives are required to evaluate each data portion, more steps are required to calculate the final output for a given gate. Further, as the number of primitives increases, the chip area required for the primitives increases. For example, an N-bit×N-bit multiplier requires 2×N-bit product. When N=2, only four input primitives are requires. However, when N=4, a total of 248 four input primitives need to be evaluated. When N=8, sixteen 16 input primitives would be evaluated to provide the product. Each sixteen input primitive requires 8095 four input primitives. The full product requires 129,520 four input primitives. Thus, such a solution is inefficient in its use of emulation steps as well as its use of chip area.

In a second solution used in the prior art, a larger primitive may be used to emulate a large input gate. A larger primitive is able to perform faster calculations since there are fewer levels of logic to evaluate, i.e., a single primitive can represent many levels of logic. However, because the size of the lookup table (i.e., the hardware that stores the logic table) used by the primitive is exponentially related to the input size of the primitive, larger primitives require substantially larger chip areas to accommodate the lookup tables. Consequently, the practically achievable size of the hardware emulator chip ultimately limits the use of large primitives.

Thus, there is a need in the art for a method and apparatus that improves primitive utilization in a hardware emulator to facilitate large input gate emulation.

SUMMARY OF THE INVENTION

The present invention is a hardware emulator having a first primitive for evaluating functions having a first input width and a second primitive, coupled to the first primitive, for evaluating a function having a second input width, where the first input width is unequal to the second input width. The use of either the first primitive or the second primitive is selected depending upon the function to be evaluated. Thus, when a logic table to be used to evaluate a function is impractical to include within a control word for the emulation, the invention uses the second primitive, where the logic table is stored separately from the control word. The second primitive may evaluate functions having variable input width, i.e., an input width that may change from emulation step to emulation step.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention is a hardware emulator having a variable input primitive. An exemplary emulation engine used in a hardware emulator is disclosed in U.S. Pat. No. 6,618,698 "Clustered Processors in an Emulation Engine" and U.S. Pat. No. 5,551,013 "Multiprocessor for Hardware Emulation" which are hereby incorporated by reference in their entirety. Such emulation engines as described in these patents can benefit from the use of the variable input primitive of the present invention.

Figure 1:
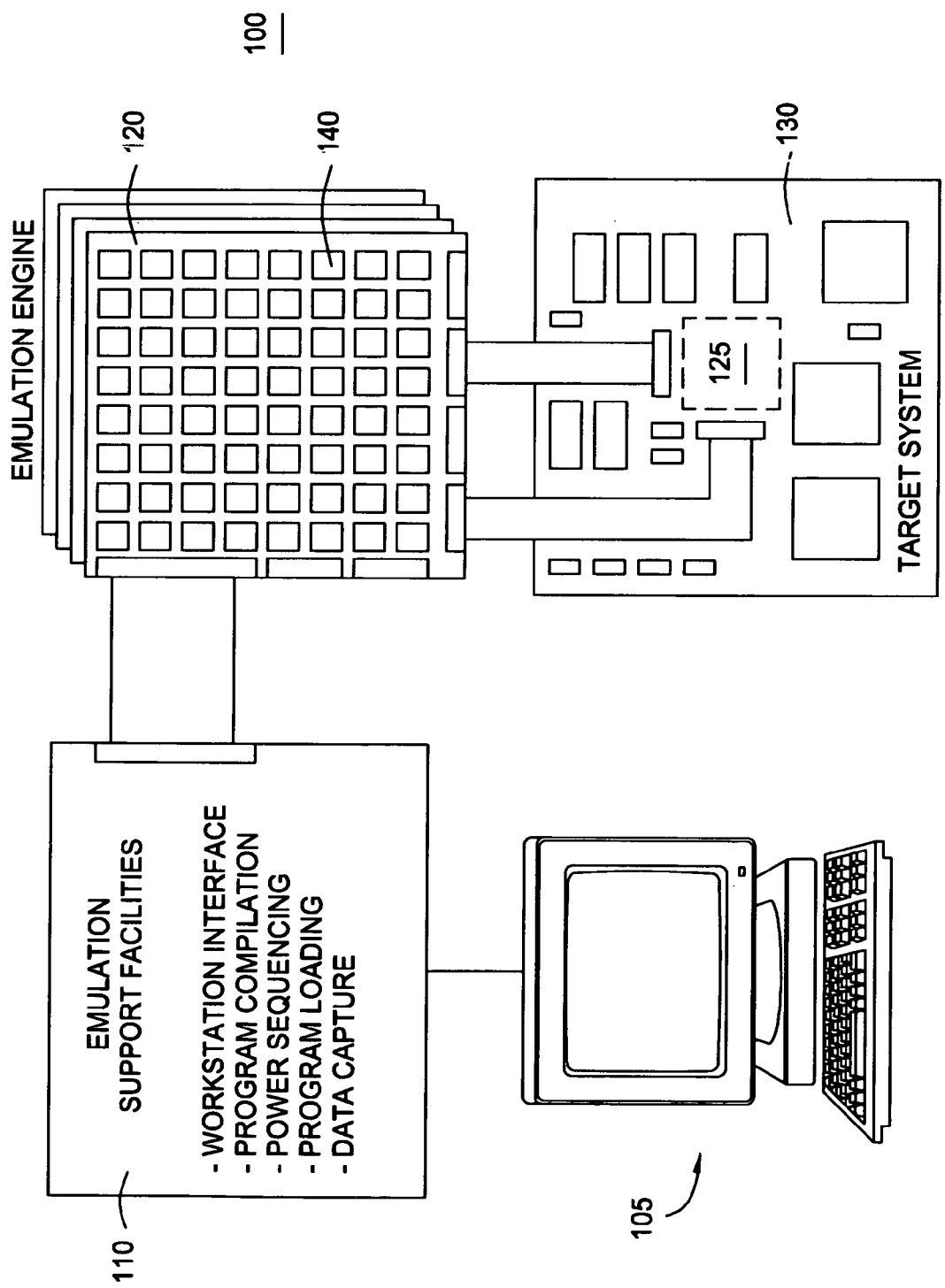
FIG. 1 is an overview of an emulation system.

FIG. 1 is an overview of a hardware emulator system 100. The system 100 comprises a computer workstation 105, emulation support facilities 110, an emulation engine 120 (also referred to herein as an emulation system 120) and a target system 130. The computer workstation 105 is coupled to the emulation support facilities 110. The computer workstation 105 allows a user to interface with the emulation engine 120, control the emulation process and collect emulation results for analysis. The emulation support facilities 110 provide a workstation interface, program compilation, power sequencing, program loading and data capture. Programming information and data is loaded to the emulation engine 120 from the support facilities 110.

In response to the programming received from the emulation support facilities 110, the emulation engine 120 utilizes a plurality of emulation integrated circuits 140 (emulation chips) to emulate a portion 125 of the target system 130. The portion 125 of the target system 130 may be an integrated circuit, a memory, a processor, or any object or device that can be emulated in a programming language. Popular emulation languages include Verilog and VHDL.

Figure 2:
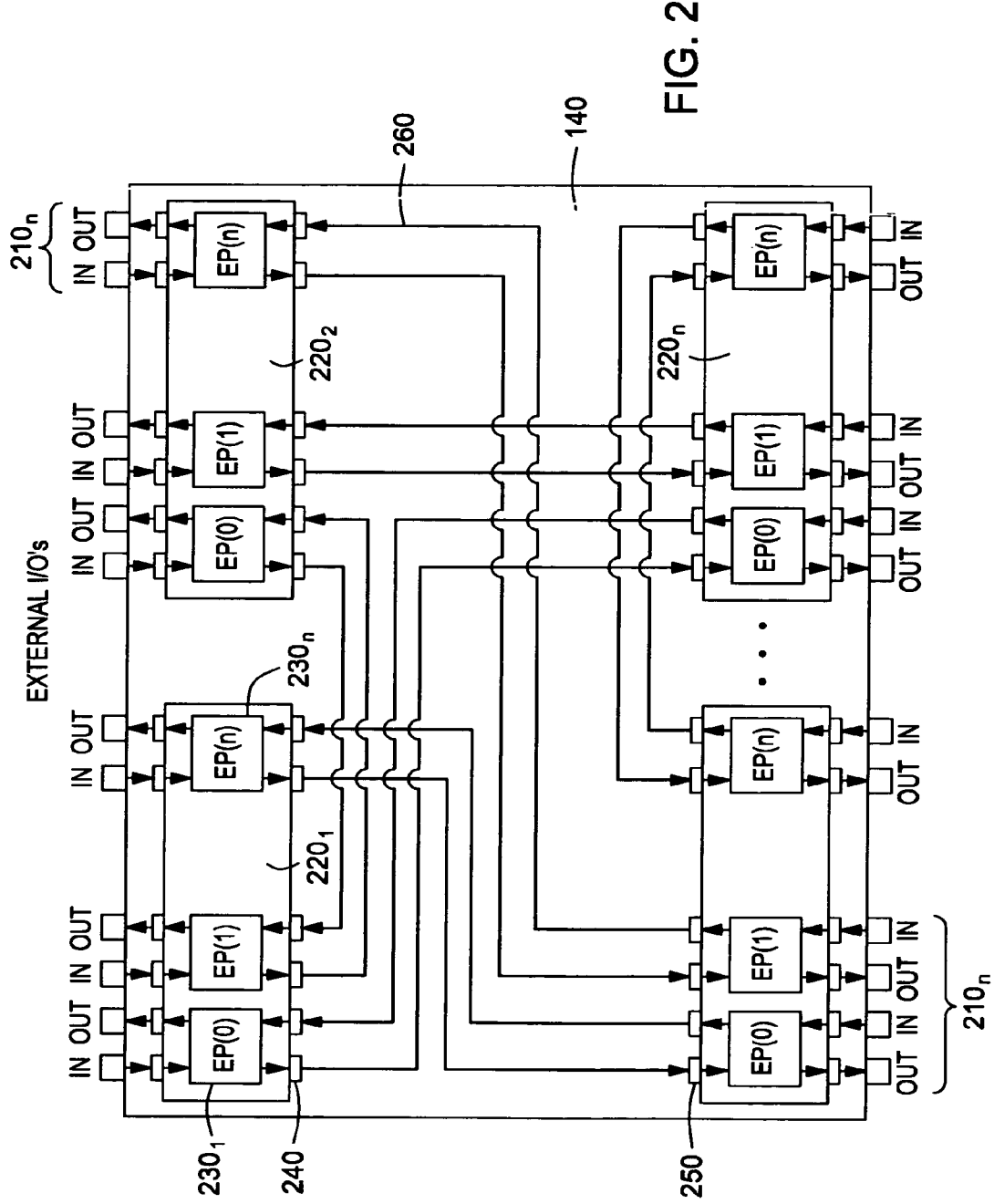
FIG. 2 is a block diagram of an emulation engine that is part of the emulation system.

FIG. 2 is a block diagram of an emulation chip 140. The emulation chip 140 comprises clusters 220 of processor modules 230. The emulation chip 140 communicates with the target system (130 in FIG. 1) and the emulation support facilities (110 in FIG. 1) through multiple inputs and outputs, collectively $210_n$ (where n is an integer). Each cluster 220 comprises multiple processor modules $230_n$ (where n is an integer) and multiple cluster inputs 250 and cluster outputs 240. The processor modules $230_n$ are generally identical to one another. The outputs 240 of each cluster 220 connect directly to the inputs 250 of the other clusters 220 within the emulation engine 200 via interconnections 260.

Each processor module $230_n$ within a cluster $220_n$ is loaded with a specific sequential set of control words. These control words are sequentially supplied to the components with the processor module $230_n$ to cause the processors to emulate logic gates. This emulation occurs by having each processor perform a particular function (a primitive) upon a specific set of input data at a particular time. The input data may be generated within the processor module, within other processor modules in a cluster or within other clusters. The output of the function is stored within the processor module $230_n$ for use by the processor module that generated the output, by other processor modules within a cluster, or by other clusters. Through repeated utilization of the processor module $230_n$, data processing that occurs in hardware logic is emulated by the processor modules. To enhance the performance of a processor within a processor module $230_n$, the invention comprises a variable input primitive as described below.

Figure 3:
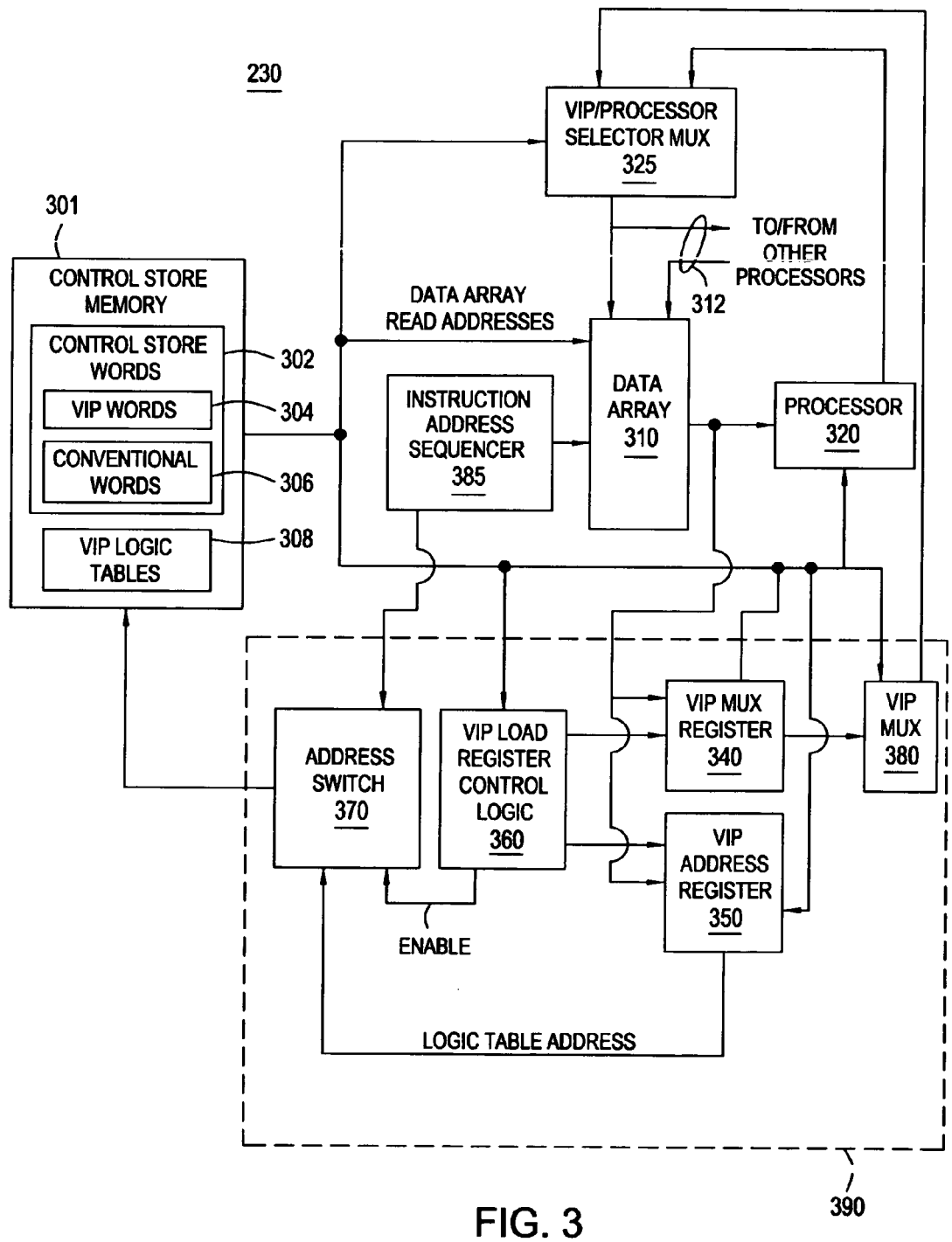
FIG. 3 is a block diagram of a processor module.

FIG. 3 is a block diagram of a processor module 230. The processor module 230 comprises a control store memory 301, a data array 310, a processor 320, an instruction address sequencer 385, a VIP/processor select multiplexer 325 and a variable input primitive (VIP) 390. The VIP 390 comprises a Variable Input Primitive (VIP) register 340, a VIP address register 350, a VIP load register control logic 360, an address switch 370, and a VIP multiplexer 380. The VIP 390 is arranged to support the processor 320 and enable the processor module 230 to evaluate large input gates (e.g., greater than 6-bits wide). More specifically, the processor 320 and data array 310 function together to evaluate functions of "small" input gates, e.g., 4-bit inputs. While, when needed, the VIP 390 augments the abilities of the processor 320 to enable the processor module 230 to also evaluate functions having "large" input width, e.g., more than 6-bits. The large input functions are representative of either large input gates or assemblies of small input gates that together perform a function having a large number of inputs. Using the VIP 390, the assembly of small input gates can be evaluated using fewer processor emulation steps than performing the evaluation using a small input primitive for each gate in the assembly.

Upon initialization of the emulator, an emulation program is loaded into the control store memory 301. The emulation program comprises a series (or stack) of control store words 302. In operation, for each emulation step, a new control store word 302 is supplied from the memory 301 and used by the components of the processor module 230 to produce an output that represents the function of a logic gate. These logic functions are performed in accordance with timing generated by the instruction address sequencer 385. The control store words 302 from memory 301 supply a data array read addresses to the data array 310 to provide four input bits to the processor 320, provide a selection bit to the VIP/processor selector multiplexer 325 to facilitate selection of a data bit to be stored in the data array 310 for future use, and provide control information to the VIP 390. As each control store word 302 is executed, specific data is supplied from the data array 310 to the processor 320. The VIP 390 enables the processor module 230 to emulate gates having input data widths that are wider than the processor width (e.g., 4-bits). The control store words 302 may contain words that are intended for conventional gate widths (4-bit primitive) and words that are intended to emulate wide gate widths (more than 4-bit primitive). Herein, control store words 302 for conventional processing are referred to as conventional words 306 and control store words 302 used for VIP processing are referred to as VIP words 304. The conventional words 306 contain the logic table that is used by the processor to evaluate the function, while the logic table associated with a VIP word is too large to fit within the VIP word itself. As such, the logic tables for VIP processing are stored in memory separate from the VIP word. The processor module 230 seamlessly utilizes either type of control store word such that variable input processing may be performed as needed to emulate either conventional or wide input gates.

To evaluate a 4-bit function, the processor 320 operates as a 16-bit lookup table (i.e., a 16-bit multiplexer having a 4-bit selection address). The logic table used to populate data bits into the lookup table is contained within the conventional word 306. When a VIP word 304 is used, the VIP 390 is enabled to evaluate a function having a width wider than the processor 320 can handle. For example, a VIP word 304 may cause a 15-bit function to be evaluated by using 8-bits to select and load a 128-bit logic table into the VIP 390 and use 7-bits to select a particular output bit from the logic table (i.e., a 128-bit multiplexer having a 7-bit selection address).

Generally, the conventional words contain the 16-bit logic table that is used by the processor 230 in the evaluation. During a step of the emulation cycle, the conventional word provides the logic table to the processor and addresses the 4 input bits from the data array 310. Using the selected input data, the processor 320 generates a 1-bit output that is passed through the multiplexer 325 to the data array 310 for storage. The input data within the data array 310 that is available for processing include data from the processor 320, the VIP 390, other processors in the cluster and other clusters. The data array is coupled to a bus 312 that connects the data array to other clusters and processors such that data can be shared amongst the processors and clusters.

To process wide functions, specific wide logic tables are stored in the control store memory 301 (or in other memory within the processor module 230). The logic tables are stored in a portion of the memory 301 that is unused by the control word stack. Upon the occurrence of a VIP word 304 as a control store word (CSW), the VIP 390 is enabled and a particular VIP logic table 308 is loaded into the VIP 390 to facilitate evaluation of a large input gate. Using both information from a VIP word 304 and selected input data from the data array 310, the VIP 390 generates a 1-bit output that is coupled through the multiplexer 325 for storage in the data array 310.

More specifically, when a "large" input gate (or an assembly of small input gates) is to be evaluated, the CSW contains a VIP word 304 that is coupled to the VIP multiplexer 380. The VIP word 304 is a specially designed instruction word that enables the VIP 390, when necessary, and provides the VIP 390 with information to evaluate a function of a wide input gate. In response to the VIP word 304, the data array 310 provides input data to the VIP multiplexer register 340 and the VIP address register 350. The input data may contain data from other processors within the cluster, other clusters, a prior output of the VIP 390, or a prior output of the processor 320. The instruction address sequencer 385 provides timing information and sequential read/write addresses to the data array 310 and the address switch 370 within the VIP 390.

The address switch 370 selects either an address from the instruction address sequencer 385 or an address from the VIP address register 350. To select the next control word in the instruction sequence, the sequencer 385 supplies an address through the switch 370 to the control store memory 301. The addressed control word, if it is a VIP word 304, contains addressing information to select a VIP MUX register 340, a VIP address register 350, and select information to load into the registers 340 and 350 under the control of the VIP load register control logic 360. The register 350 provides an address that is coupled through the address switch 370 to the control store memory 301. This address selects a VIP logic table 308 for loading into the VIP multiplexer 380. The table may comprise 32 bits, 64 bits, 128 bits, or any length of bits capable of being stored by the control store memory 301. Once loaded, the selected VIP MUX register 340 supplies a multi-bit selection value to select one bit of the VIP logic table 308 as an output of the VIP 390. For a 128-bit logic table, the selection value is 7 bits. Consequently, a 15-bit function can be evaluated using 8-bits (higher order bits) to select an appropriate 128-bit logic table and 7-bits (lower order bits) to select an output bit from the table.

When using the VIP 390 to emulate assemblies of gates, a single VIP word 304 may initiate a function that would otherwise require many conventional words to perform. As such, by using VIP words in lieu of many conventional control words, memory space in the control store memory is made available for storing additional VIP logic tables. However, the control store memory 301 is not the only memory available within a processor module for storing the logic tables. In an alternative embodiment, the VIP logic tables may be stored in read only memory (ROM) rather than within unused space within the control store memory 301. As a further alternative, unused memory space within the data array 310 may also be used to store VIP logic tables.

More specifically, the VIP load register control logic 360 controls the VIP operation by providing "enable" bits to the VIP multiplexer register 340, the VIP address register 350, and the address switch 370. Generally, a single bit in the VIP word 304 controls enabling the switch 370 as well as selecting the VIP input of the VIP/Processor selector multiplexer 325. The VIP load register control logic 360 enables the VIP multiplexer register 340 and the VIP address register 350 when they are to store data provided by the data array 310. At the appropriate time, the next step after the registers are loaded, the VIP load register control logic 360 also enables the address switch 370 to provide a read address to the control store memory 301 to access a particular VIP logic table 308 corresponding to the large input gate function being emulated. The function is then emulated during that step. Alternatively, once the registers are loaded, another VIP word could be used to enable the emulation at a later step.

In an alternative embodiment, the VIP load register control logic 360 may supply enable bits to all the VIP registers 340/350 within a cluster (e.g., four sets of enable bits to four processor modules).

The VIP multiplexer 380 receives a VIP logic table 308 from the control store memory 301. The tables may be M×N arrays of function values, where M and N are integers. In one specific embodiment, the logic tables are 1×N arrays, where N is the integer number of possible results of the function being evaluated. A selected table is applied to the input of the VIP multiplexer 380. The data from the data array 310 and a portion of the VIP word 304 are coupled to the VIP multiplexer register 340. The combination forms a selection value that selects one bit out of the 128-bit table. The one bit output selected by the VIP multiplexer 380 is coupled to the VIP/processor selector multiplexer 325. The VIP/processor selector multiplexer 325 selects between the output of the processor 320 and the output of the VIP multiplexer 380, then writes the selected output to the data array 310. During VIP operation, the VIP output bit is written to the data array 310 and, during conventional operation, the processor bit is written to the data array 310.

In this manner, the VIP multiplexer 380 selects a one bit output from the VIP logic table 308 comprising 128 possible output results that are selected using a 7-bit selection value. As such, a function of a gate having a 15-bit wide input can be evaluated using the 7-bit selection value, an 8-bit address for the table in memory, and a 128-bit logic table. The memory location in the control store memory used to store the 15-input primitive logic table could be used to store multiple tables with various other smaller sizes.

Figure 4:
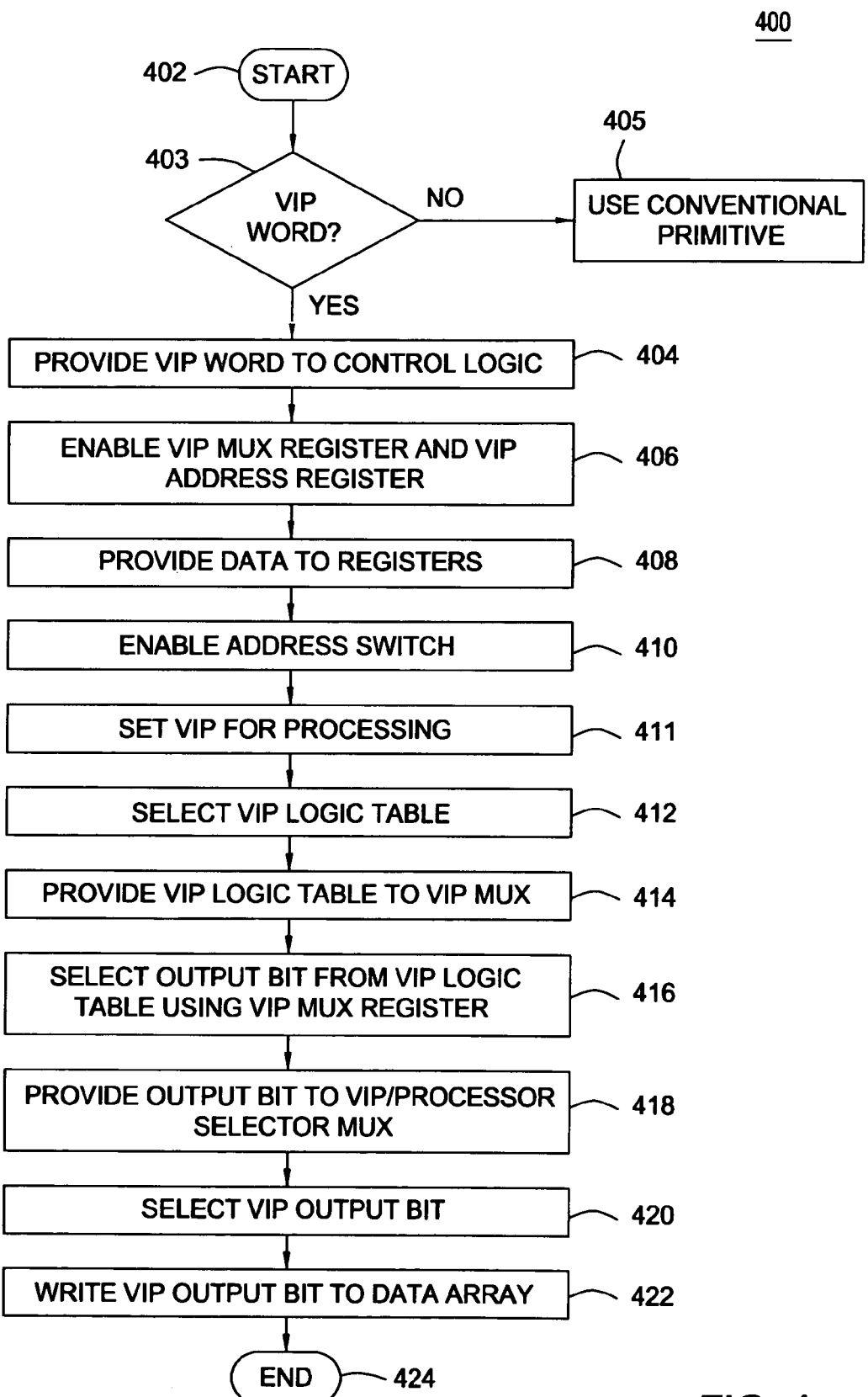
FIG. 4 is a flow diagram of a method for using the present invention.

FIG. 4 is a method of using the VIP depicted in FIG. 3. FIG. 4 read in conjunction with FIG. 3 describes a method of using the present invention to enhance the emulation capabilities of the processor module 230. During any one emulation steps, any number of the following blocks may be performed. In one embodiment of the invention, blocks 404, 406, 408, 410 and 411 are performed in one step of an emulation cycle to load information into the VIP and blocks 412, 414, 416, 418, 420, and 422 are performed in a second step of an emulation cycle to evaluate the function.

The method 400 begins at block 402 and proceeds to block 403, where the method 400 queries whether the instruction is a VIP word. If the instruction is not a VIP word, the method 400 proceeds to block 405 where the instruction is conventionally processed using a conventional primitive as discussed above. If the instruction is a VIP word, the method proceeds to block 404 wherein the control store memory 301 provides a VIP word to the VIP load register control logic 360. The VIP word enables the VIP load register control logic 360 to begin an evaluation of a large input gate function.

At block 406, the VIP load register control logic 360 supplies enabling bits to the VIP multiplexer register 340 and the VIP address register 350. The enabling bits enable the VIP multiplexer register 340 and the VIP address register 350 to receive data from the data array 310, e.g., 4-bits of data. At block 408, the data array 310 couples data to the Multiplexer Register 340 and VIP address register 350. The data stored in the data array 310 includes data processed by the processor 310, other processors, other clusters and output data from the VIP multiplexer 380. The data that is to be used for the evaluation is selected to facilitate the evaluation to be performed in response to the instruction in the control store memory.

At block 410, the VIP load register control logic 380 enables the address switch 370 to couple the address from the VIP address register 350 to the memory 301. At block 411, the VIP is set for processing. At block 412, the address switch 370 uses the address to select a VIP logic table from the control store memory 301. At block 414, the selected VIP logic table is provided to the VIP multiplexer 380. At block 416, the data stored in the VIP multiplexer register 340 is used to select a one bit output from the VIP logic table provided to the VIP multiplexer 380. At block 418, the 1-bit output selected from the VIP logic table is provided to the VIP/selector multiplexer 325. At block 420, the VIP/selector multiplexer 325 selects the VIP output to be coupled to the data array 310. At block 422, the selected output is written to the data array 310. The method 400 ends at block 424.

A variable input operation requires more than one emulation step to complete the evaluation of data. However, the variable input operation is more efficient at evaluating a greater amount of data than a conventional processor operation. For example, a variable input operation can evaluate a 128-bit data word in a minimum of two emulation steps, while a conventional processor operation would require a minimum of fifteen emulation steps to emulate the same amount of data. During an evaluation, there are some steps that do not require the use of a processor 320 to evaluate the function (i.e., these are steps when the processor is unused). When this occurs, the data array 310 outputs are redirected to VIP registers 340/350. The number of steps needed to store all the data bits is dependent on the number of bits in the wide evaluation divided by four (i.e., the number of data array outputs). For example, if 15 bit function is being evaluated using the VIP, four steps are required to redirect all the needed bits from the data array 310 to be stored in the VIP registers 340/350. Alternatively, by using other processors in the cluster to supply data bits, the number of steps used to load the registers 340/350 can be reduced. For example, with four processors in a cluster and four data bits being supplied from each data array associated with each processor, the VIP registers 340/350 can be loaded in one step.

Once all the required bits have been stored in the VIP registers 340/350, an instruction 304 indicates a "VIP operation on the next step". This instruction triggers the address switch 370 to select the VIP address register value as the next address sent to the control store memory 301. This 8-bit address is simply the word location containing 128-bit slice of the logic table that needs to be read to select 1-bit to complete the 15-bit evaluation. Note that not all the bits in the VIP multiplexer register 340 need to be loaded before "VIP operation on the next step" is indicated by the VIP word 304. The VIP multiplexer register 340 could be loaded using parts of the VIP word 304. The VIP address register 350 must be loaded and valid before "VIP operation on next step" is indicated by the VIP word 304.

On the next step, the logic table is read from the VIP logic table are 308 of the control store memory 301. This value is sent to the VIP multiplexer 380, which uses the VIP multiplexer register value to select 1 bit from the logic table. This bit is sent to the VIP/Processor selector multiplexer 325. This selector multiplexer 325 has also received the "VIP operation on the next step" indicator. Using this indicator, the selector multiplexer 325 directs the output of the multiplexer 380 to be stored in the location in the data array 310 addressed by the sequencer 385.

Therefore, in total, one or more steps are used to load VIP registers 340/350. When loaded, a signal indicates the next step is a VIP operation. During the next step, the VIP evaluation is completed and stored in the data array.

If the same VIP operation is to be used in subsequent steps of the emulation, the particular VIP operation may be reused by other steps. For example, the VIP operation may be repeated, without reloading the VIP registers, and store the VIP operation output bit for subsequent use by later steps in the emulation. Such reuse, avoids the registering loading step for a VIP operation and ultimately reduces the length of the emulation cycle.

The efficiency of an emulation cycle is directly related to the greatest number of emulation steps required by any processor to complete the evaluation of the data. For example, assume a cluster of processors included eight processors. A small number of processors may require 512 emulation steps to complete the evaluation of data, while the remaining processors only require 256 emulation steps to complete the evaluation of data. The emulation cycle is not completed until all the processors have completed the evaluation of data, i.e., after 512 emulation steps. After 256 emulation steps, the processors in the cluster that only need 256 emulation steps to evaluate data remain idle for the remainder of the emulation cycle. Thus, 256 out of 512 emulation steps in the emulation cycle are not utilized by the seven processors. Reducing the number of steps in the worst case path, i.e., reducing the number of steps to 256 or below, improves the emulation performance. Additionally, enabling each of the processors in the cluster of processors to complete the evaluation of data at approximately the same time in the emulation cycle increases the efficiency of evaluating the data. Prior solutions involve balancing the load placed on each processor such that each processor could complete the evaluation of data at approximately the same time as the other processors in the emulation engine. However, certain types of data require intensive processing and a greater number of emulation steps to complete the evaluation of data by the processor. A conventional processor operation produces a one bit output from a four bit input, i.e., the processor is only capable of evaluating four bits of data per emulation step. A variable input operation is capable of evaluating more bits of data than a conventional processor operation in fewer emulation steps. Thus, the variable input operation increases the efficiency of the emulation engine.

While the foregoing is directed to embodiments of the present invention, other and further embodiments of the invention may be devised without departing from the basic scope thereof, and the scope thereof is determined by the claims that follow.

What is claimed is:

1. A method for emulating hardware comprising:
   determining whether an instruction is a variable input primitive (VIP) word:
   executing a first control word in a processor module to evaluate a first function of at least one gate the first function having a first input width; and
   executing a second control word in the processor module to evaluate a second function of at least one gate the second function having a second input width, where the first input width is unequal to the second input width, and the second input width is greater than four bits.

2. The method of claim 1 wherein the first input width is smaller than the second input width.

3. The method of claim 1 further comprising accessing the first control word and the second control word from a control store memory using a switch.

4. The method of claim 1 wherein executing the second control word further comprises:
   supplying a first amount of data to a first register;
   supplying a second amount of data to a second register;
   using the first amount of data stored in the first register to select a logic table from a memory; and
   selecting a data bit from the logic table using the second amount of data stored in the second register.

5. The method of claim 4 wherein the first amount of data and the second amount of data is supplied, at least in part, by a data array.

6. The method of claim 5 wherein the first amount of data and the second amount of data is selected, in part, from the data array by the first or second control word.

7. The method of claim 1 wherein the logic table is stored in at least one of a control store memory, data array or read-only memory.

8. The method of claim 1 wherein the first input width is 4-bits.

9. The method of claim 1 wherein the processor module generates a first output bit responsive to the first control word and generates a second output bit responsive to the second control word.

10. The method of claim 9 further comprising selecting the first output bit for storage in a data array in response to the first control word and selecting the second output bit for storage in a data array in response to the second control word.

11. The method of claim 1 wherein the processor module executes the second control word using two emulation steps.

12. The method of claim 11 wherein a first emulation step loads data into the processor module and a second emulation step evaluates the second function.

13. A hardware emulator having a processor module comprising:
   a control store memory including one or more variable input primitive (VIP) words, one or more conventional words and a variable input primitive logic table:
   a first primitive for evaluating a first function of at least one gate, the first function having a first input width; and
   a second primitive, coupled to the first primitive, for evaluating a second function of at least one gate, the second function having a second input width, where the first input width is unequal to a second input width, and the second input width is greater than four bits.

14. The hardware emulator of claim 13 wherein the first input width is smaller than the second input width.

15. The hardware emulator of claim 13 wherein: the control store memory is configured to store control words that are sequentially executed to selectively activate the first primitive or the second primitive.

16. The hardware emulator of claim 13 further comprising a data array for storing a first output from the first primitive in response to the first primitive evaluating the first function and for storing a second output from the second primitive in response to the second primitive evaluating the second function.

17. The hardware emulator of claim 13 wherein the second primitive comprises:
   a multiplexer for selecting a bit from a logic table;
   a first register for generating a selection address for the multiplexer to select the output bit from the logic table; and
   a second register for generating an address for a location of the logic table in a memory.

18. The hardware emulator of claim 17 wherein the logic table has a variable size depending upon the second input width of the second function being evaluated by the second primitive.

19. The hardware emulator of claim 13 wherein the logic table is stored in at least one of a control store memory, a data array, and a read-only memory.

20. A hardware emulation system comprising:
   a plurality of clusters of processor modules, where each processor module comprises:
   a first primitive for evaluating a first function of at least one gate, the first function having a first input width;
   a second primitive, coupled to the first primitive, for evaluating a second function of at least one gate, the second function having a second input width, where the first input width is unequal to a second input width, and the second input width is greater than four bits;
   a control store memory including one or more variable input primitive (VIP) words, one or more conventional words and a variable input primitive logic table, wherein the control store includes a memory for storing control words that are sequentially executed to selectively activate the first primitive or the second primitive; and
   a data array for storing a first output from the first primitive in response to the first primitive evaluating the first function and for storing a second output from the second primitive in response to the second primitive evaluating the second function.

21. The hardware emulation system of claim 20 wherein the second primitive comprises:
   a multiplexer for selecting a bit from a logic table;
   a first register for generating a selection address for the multiplexer to select the output bit from the logic table; and
   a second register for generating an address for a location of the logic table in a memory.

22. The hardware emulation system of claim 21 wherein the logic table has a variable size depending upon the second input width of the second function being evaluated by the second primitive.

23. The hardware emulation system of claim 21 wherein the logic table is stored in at least one of a control store memory, a data array, and a read-only memory.

24. The hardware emulation system of claim 20 wherein the first input width is smaller than the second input width.

* * * * *